(12) United States Patent
Yao et al.

(10) Patent No.: US 10,070,350 B2
(45) Date of Patent: Sep. 4, 2018

(54) NETWORK COORDINATION APPARATUS

(71) Applicant: Nokia Solutions and Network Oy, Espoo (FI)

(72) Inventors: Yi Zhi Yao, Beijing (CN); Bernhard Wegmann, Holzkirchen (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/914,332

(22) PCT Filed: Aug. 26, 2013

(86) PCT No.: PCT/EP2013/067621
§ 371 (c)(1),
(2) Date: Feb. 25, 2016

(87) PCT Pub. No.: WO2015/028043
PCT Pub. Date: Mar. 5, 2015

(65) Prior Publication Data
US 2016/0205596 A1    Jul. 14, 2016

(51) Int. Cl.
| | |
|---|---|
| *H04W 4/00* | (2018.01) |
| *H04W 36/00* | (2009.01) |
| *H04W 24/08* | (2009.01) |
| *H04W 24/02* | (2009.01) |

(52) U.S. Cl.
CPC ....... *H04W 36/0061* (2013.01); *H04W 24/08* (2013.01); *H04W 36/0016* (2013.01); *H04W 36/0083* (2013.01); *H04W 24/02* (2013.01)

(58) Field of Classification Search
CPC ............. H04W 36/0083; H04W 24/08; H04W 36/0016; H04W 24/02; H04W 24/00; H04W 24/04; H04W 36/0022
See application file for complete search history.

(56) References Cited

U.S. PATENT DOCUMENTS

| | | | |
|---|---|---|---|
| 7,031,266 B1* | 4/2006 | Patel | H04L 45/02 370/254 |
| 9,392,471 B1* | 7/2016 | Thomas | H04W 36/0083 |
| 9,674,717 B2* | 6/2017 | Kobayashi | H04W 24/02 |
| 2007/0087752 A1* | 4/2007 | Voyer | H04W 24/02 455/436 |
| 2007/0127398 A1* | 6/2007 | Cai | H04W 24/02 370/254 |
| 2009/0005052 A1* | 1/2009 | Abusch-Magder | H04W 24/02 455/446 |
| 2009/0054047 A1* | 2/2009 | Kylvaja | H04L 41/0823 455/418 |

(Continued)

OTHER PUBLICATIONS

3GPP TR 32.826 V10.0.0 (Mar. 2010), "3$^{rd}$ Generation Partnership Project; Technical specification Group Services and System Aspects; Telecommunication management; Study on Energy Savings Management (ESM) (Release 10)", 33 pgs.

(Continued)

*Primary Examiner* — Kevin Mew
(74) *Attorney, Agent, or Firm* — Harrington & Smith

(57) ABSTRACT

A method including receiving a message at a first cell including at least one of: state information for the first cell; and state information for any neighbouring cells of the first cell; and determining a neighbouring relationship between the first cell and any neighbouring cells.

12 Claims, 9 Drawing Sheets

(56) References Cited

U.S. PATENT DOCUMENTS

| | | | | |
|---|---|---|---|---|
| 2009/0318132 | A1* | 12/2009 | Chiou | H04W 24/08 455/423 |
| 2012/0015657 | A1* | 1/2012 | Comsa | H04W 36/0094 455/436 |
| 2012/0093001 | A1* | 4/2012 | Ljung | H04L 41/0816 370/241 |
| 2012/0142328 | A1* | 6/2012 | Awoniyi | H04W 36/22 455/418 |
| 2012/0163238 | A1* | 6/2012 | Gunnarsson | H04W 16/08 370/254 |
| 2012/0270550 | A1* | 10/2012 | Shi | H04W 24/02 455/436 |
| 2012/0276915 | A1* | 11/2012 | Kubota | H04B 7/024 455/452.1 |
| 2013/0010644 | A1 | 1/2013 | Chen et al. | 370/255 |
| 2013/0143561 | A1* | 6/2013 | Nuss | H04W 24/02 455/436 |
| 2013/0189991 | A1* | 7/2013 | Rose | H04W 16/18 455/436 |
| 2014/0057628 | A1* | 2/2014 | Wong | H04W 24/02 455/424 |
| 2014/0162660 | A1* | 6/2014 | Loborg | H04W 24/02 455/438 |
| 2014/0162682 | A1* | 6/2014 | Tafreshi | H04W 24/02 455/456.1 |
| 2014/0169160 | A1* | 6/2014 | Sridhar | H04W 28/0289 370/229 |
| 2015/0334614 | A1* | 11/2015 | Banks | H04W 36/0016 455/444 |
| 2016/0127923 | A1* | 5/2016 | Matsunaga | H04W 24/02 455/418 |
| 2016/0205596 | A1* | 7/2016 | Yao | H04W 36/0083 370/329 |
| 2017/0026856 | A1* | 1/2017 | Thomas | H04W 36/0083 |

OTHER PUBLICATIONS

3GPP TR 32.834 V11.0.0 (Jan. 2012), "3rd Generation Partnership Project; Technical Specification Group Services and System Aspects; Study on Operations, Administration and Maintenance (OAM) aspects of inter-radio-access-technology (RAT) energy saving (Release 11)", 26 pgs.

3GPP TR 36.887 V0.1.0 (May 2013), "3rd Generation Partnership Project; Technical Specification Group Radio Access Network; Evolved Universal Terrestrial Radio Access (E-UTRA); Study on Energy Saving Enhancement for E-UTRAN (Release 12)", 13 pgs.

3GPP TR 36.927 V11.0.0 (Sep. 2012), "3rd Generation Partnership Project; Technical Specification Group Radio Access Network; Evolved Universal Terrestrial Radio Access (E-UTRA); Potential solutions for energy saving for E-UTRAN (Release 11)", 22 pgs.

3GPP TS 28.652 V11.1.0 (Mar. 2013), "3rd Generation Partnership Project; Technical Specification Group Services and System Aspects; Telecommunication management; Universal Terrestrial Radio Access Network (UTRAN) Network Resource Model (NRM) Integration Reference Point (IRP); Information Service (IS) (Release 11)", 40 pgs.

3GPP TS 28.655 V11.0.0 (Mar. 2013), "3rd Generation Partnership Project; Technical Specification Group Services and System Aspects; Telecommunication management; GSM/EDGE Radio Access Network (GERAN) Network Resource Model (NRM) Integration Reference Point (IRP); Information Service (IS) (Release 11)" 18 pgs.

3GPP TS 28.658 V11.2.0 (Jun. 2013), "3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)", 53 pgs.

3GPP TS 32.425 V12.0.0 (Jun. 2013), "3rd Generation Partnership Project; Technical Specification Group Services and System Aspects; Telecommunication management; Performance Management (PM); Performance measurements Evolved Universal Terrestrial Radio Access Network (E-UTRAN) (Release 12)", 74 pgs.

3GPP TS 32.511 V11.2.0 (Sep. 2012), "3rd Generation Partnership Project; Technical specification Group Services and System Aspects; Telecommunication management; Automatic Neighbour Relation (ANR) management; Concepts and requirements (Release 11)", 13 pgs.

3GPP TS 32.522 V11.6.1 (Jun. 2013), "3rd Generation Partnership Project; Technical Specification Group Services and Systems Aspects; Telecommunication management; Self-Organizing Networks (SON) Policy Network Resource Model (NRM) Integration Reference Point (IRP); Information Service (IS) (Release 11)", 57 pgs.

3GPP TS 32351 V11.3.1 (Jun. 2013), 3rd Generation Partnership Project; Technical specification Group Services and System Aspects; Telecommunication management; Energy Saving Management (ESM); Concepts and requirements (Release 11):, 26 pgs.

ETSI TS 132 762 V11.5.0 (Apr. 2013), "Digital cellular telecommunications system (Phase 2+); Universal Mobile Telecommunications System (UMTS); LTE; Telecommunication management; Evolved Universal Terrestrial Radio Access Network (E-UTRAN Network Resource Model (NRM) Integration Reference Point (IRP); Information Service (IS) (3GPP TS 32.762 version 11.5.0 Release 11)", 59 pgs.

ETSI TS 136 300 V11.6.0 (Jul. 2013), "LTE; Evolved Universal Terrestrial Radio Access (E-UTRA) and Evolved Universal Terrestrial Radio Access Network (E-UTRAN); Overall description; Stage 2 (3GPP TS 36.300 version 11.6.0 Release 11)", 223 pgs.

ETSI TS 136 423 V11.5.0 (Jul. 2013), "LTE; Evolved Universal Terrestrial Radio Access Network (E-UTRAN); X2 Application Protocol (X2AP) (3GPP TS 36.423 version 11.5.0 Release 11)", 145 pgs.

3GPP TSG-RAN WG3 #59bis, Mar. 31-Apr. 3, 2008, Shenzhen, China, R3-080933, "Clarifications on ANR Blacklists and Whitelists", Qualcomm Europe, T-Mobile, Telecom Italia, Orange, 4 pgs.

TSG-RAN Working Group 3 meeting #80, Fukuoka, Japan May 20-24, 2013, R3-130789, "Draft report of 3GPP TSG RAN WG3 meeting #79bis", MCC, 87 pgs.

3GPP TSG-RAN WG3 Meeting #80, Fukuoka, Japan, May 20-24, 2013, R3-131094, "Scenarios for SON for AAS-based deployments", Nokia Siemens Networks, 2 pgs.

Carreno, Edgar Manuel, et al., "A Cellular Automaton Approach to Spatial Electric Load Forecasting", IEEE Transactions on Power Systems, vol. 26, No. 2, May 2011, 9 pgs.

* cited by examiner

NETWORK COORDINATION APPARATUS

FIELD OF APPLICATION

The invention relates to network coordination apparatus for configuring one or more network entities, but not exclusively limited to configuring one or more network entities within a self-organising network.

BACKGROUND OF APPLICATION

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems a network element or network entity (NE) or access node is provided by a base station. The radio coverage area of a base station is known as a cell, and therefore the wireless systems are often referred to as cellular systems. In some systems, for example a 3GPP standard system, a base station access node is called Node B (NB) or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

Network management is a complex task. Complexity arises on the one side from the number of network elements (NEs) that have to be deployed and managed, and on the other side from interdependencies between the configuration and the status of the deployed network elements in terms of performance, faults, etc. In a heterogeneous network the variety of deployed technologies and their proprietary operational paradigms are difficult to handle. A heterogeneous network for example, can be a network consisting of a multitude of access technologies, and different (cell) layers within these access technologies. A layer in a wireless network access technology is characterised by for example the size or geographical area covered by one network element, the transmission power, the bandwidth, the maximum throughput. Examples of cell layers are macro cells, micro and pico cells (for hotspot and enterprise coverage), and indoor cells. Furthermore some cells may only serve closed user groups.

The configuration, optimisation and troubleshooting of the management of the network therefore requires high expertise and operational management workflows to be typically performed by human operators supported by software tools. However, such manual and semi-automated management is time-consuming, error-prone, and potentially unable to react quickly enough to network changes and thus expensive.

It has been a goal of network management designers to attempt to automate operation, administration and management (OAM) functions by the deployment of "Self Organising Networks" (SON). While SON concepts are generically applicable, these focus of developments has been to Radio Access Networks (RAN) due to the large number of NE (radio base stations) distributed over large geographical areas (and thus the incurred cost to doing remote and on-site management activities). In particular, for the long term evolution (LTE) and long term evolution—advanced (LTE-A) radio access network (RAN) standards such as evolved universal mobile telecommunications system (UMTS) Terrestrial Radio Access Network (E-UTRAN), SON is considered a crucial building block, due to the anticipated high degree of distribution and heterogeneity. In other words in such networks there is expected to be a wide range of telecommunications standards being employed such as concurrent operation of 2G/3G/LTE/LTE-A network elements. Furthermore the LTE networks are believed to also be heterogeneous in structure, for example employing LTE multi-layer structures where there can be pico cells, micro cells, and macro cells all operating over the same geographical range.

Typically the SON is implemented by the application of SON functions which monitor, plan and enforce control over network elements. However because the operation of SON functions is individual and dynamic (i.e., not pre-planned), the application of SON function instances can have run-time interactions with other SON functions instances.

STATEMENT OF APPLICATION

In accordance with an embodiment there is provided a method comprising: receiving a message at a first cell comprising at least one of: state information for the first cell; and state information for any neighbouring cells of the first cell; determining a neighbouring relationship between the first cell and any neighbouring cells.

Determining a neighbouring relationship between the first cell and any neighbouring cells may comprise: determining for a first neighbouring relationship a state of the first cell; determining whether the first neighbouring relationship is applicable for at least one further state of the first cell; determining for the first neighbouring relationship a state of any neighbouring cell(s); determining whether the first neighbouring relationship is applicable for at least one further state of the any neighbouring cell(s).

Receiving a message for a first cell comprising at least one of: state information for the first cell; and state information for any neighbouring cells of the first cell may be from a management server.

Receiving a message for a first cell comprising at least one of: state information for the first cell; and state information for any neighbouring cells of the first cell may be from a base station.

The state information may comprise at least one of the following states: Normal; ES compensating; AAS reshape; AAS split; AAS merge.

Receiving a message for a first cell comprises only state information for the first cell, the method may further comprise: generating at the first cell state information defining the state of the first cell that the neighbour relation can be used for; transmitting from the first cell to any neighbouring cell defined by the neighbour relationship the first cell state information.

The method may further comprise performing collection of at least one performance management counter associated with a state of the first cell and at least one state of the any neighbouring cell(s).

Performing collection of at least one performance management counter associated with a state of the first cell and at least one state of the any neighbouring cell(s) may further comprise: collecting at least one performance management counter associated with a state of the first cell and at least one state of the any neighbouring cell(s); reporting at the end of at least one measurement collection period the defined at least one performance management counter.

According to a second aspect there is provided a method comprising: generating a message for a first cell comprising at least one of: state information for the first cell; and state information for any neighbouring cells of the first cell; and transmitting the message to the first cell.

The method may further comprise receiving from the first cell at least one performance management counter associated with a state of the first cell and at least one state of the any neighbouring cell(s).

The method may be is performed on a management server.

Generating a message for a first cell comprising at least one of: state information for the first cell; and state information for any neighbouring cells of the first cell; and transmitting the message to the first cell may be performed on a base station.

According to a third aspect there is provided an apparatus comprising: means for receiving a message at a first cell comprising at least one of: state information for the first cell; and state information for any neighbouring cells of the first cell; means for determining a neighbouring relationship between the first cell and any neighbouring cells.

The means for determining a neighbouring relationship between the first cell and any neighbouring cells may comprise: means for determining for a first neighbouring relationship a state of the first cell; means for determining whether the first neighbouring relationship is applicable for at least one further state of the first cell; means for determining for the first neighbouring relationship a state of any neighbouring cell(s); means for determining whether the first neighbouring relationship is applicable for at least one further state of the any neighbouring cell(s).

The means for receiving a message for a first cell comprising at least one of: state information for the first cell; and state information for any neighbouring cells of the first cell may be configured to receive the message from a management server.

The means for receiving a message for a first cell comprising at least one of: state information for the first cell; and state information for any neighbouring cells of the first cell may be configured to receive the message from a base station.

The state information may comprise at least one of the following states: Normal; ES compensating; AAS reshape; AAS split; AAS merge.

The message for a first cell may comprise only state information for the first cell, and the apparatus may further comprise: means for generating at the first cell state information defining the state of the first cell that the neighbour relation can be used for; means for transmitting from the first cell to any neighbouring cell defined by the neighbour relationship the first cell state information.

The apparatus may further comprise means for performing collection of at least one performance management counter associated with a state of the first cell and at least one state of the any neighbouring cell(s).

The means for performing collection of at least one performance management counter associated with a state of the first cell and at least one state of the any neighbouring cell(s) may further comprise: means for collecting at least one performance management counter associated with a state of the first cell and at least one state of the any neighbouring cell(s); means for reporting at the end of at least one measurement collection period the defined at least one performance management counter.

According to a fourth aspect there is provided an apparatus comprising: means for generating a message for a first cell comprising at least one of: state information for the first cell; and state information for any neighbouring cells of the first cell; and means for transmitting the message to the first cell.

The apparatus may further comprise means for receiving from the first cell at least one performance management counter associated with a state of the first cell and at least one state of the any neighbouring cell(s).

The apparatus may be a management server.

The apparatus comprising means for generating a message for a first cell comprising at least one of: state information for the first cell; and state information for any neighbouring cells of the first cell; and the means for transmitting the message to the first cell, may be base station.

According to a fifth aspect there is provided an apparatus comprising at least one processor and at least one memory including computer program code, the at least one memory and the computer program code configured to, with the at least one processor, cause the apparatus at least to: receive a message at a first cell comprising at least one of: state information for the first cell; and state information for any neighbouring cells of the first cell; determine a neighbouring relationship between the first cell and any neighbouring cells.

Determining a neighbouring relationship between the first cell and any neighbouring cells may cause the apparatus to: determine for a first neighbouring relationship a state of the first cell; determine whether the first neighbouring relationship is applicable for at least one further state of the first cell; determine for the first neighbouring relationship a state of any neighbouring cell(s); determine whether the first neighbouring relationship is applicable for at least one further state of the any neighbouring cell(s).

Receiving a message for a first cell comprising at least one of: state information for the first cell; and state information for any neighbouring cells of the first cell may cause the apparatus to receive the message from a management server.

Receiving a message for a first cell comprising at least one of: state information for the first cell; and state information for any neighbouring cells of the first cell may cause the apparatus to receive the message from a base station.

The state information may comprise at least one of the following states: Normal; ES compensating; AAS reshape; AAS split; AAS merge.

The message for a first cell may comprise only state information for the first cell, and the apparatus may further be caused to: generate at the first cell state information defining the state of the first cell that the neighbour relation can be used for; transmit from the first cell to any neighbouring cell defined by the neighbour relationship the first cell state information.

The apparatus may further be caused to perform collection of at least one performance management counter associated with a state of the first cell and at least one state of the any neighbouring cell(s).

Performing collection of at least one performance management counter associated with a state of the first cell and at least one state of the any neighbouring cell(s) may further cause the apparatus to: collect at least one performance management counter associated with a state of the first cell and at least one state of the any neighbouring cell(s); report at the end of at least one measurement collection period the defined at least one performance management counter.

According to a sixth aspect there is provided an apparatus comprising at least one processor and at least one memory including computer program code, the at least one memory and the computer program code configured to, with the at least one processor, cause the apparatus at least to: generate a message for a first cell comprising at least one of: state information for the first cell; and state information for any neighbouring cells of the first cell; transmit the message to the first cell.

The apparatus may be further caused to receive from the first cell at least one performance management counter associated with a state of the first cell and at least one state of the any neighbouring cell(s).

The apparatus may be a management server.

The apparatus caused to generate a message for a first cell comprising at least one of: state information for the first cell; and state information for any neighbouring cells of the first cell; and transmit the message to the first cell, may be base station.

According to a seventh aspect there is provided an apparatus comprising: a receiver configured to receive a message at a first cell comprising at least one of: state information for the first cell; and state information for any neighbouring cells of the first cell; a neighbouring relationship determiner configured to determine a neighbouring relationship between the first cell and any neighbouring cells.

The neighbouring relationship determiner may comprise: a first neighbouring relation determiner configured to determine for a first neighbouring relationship a state of the first cell; a first relationship state determiner configured to determine whether the first neighbouring relationship is applicable for at least one further state of the first cell; a neighbouring cell relation state determiner configured to determine for the first neighbouring relationship a state of any neighbouring cell(s); a neighbouring cell further state determiner configured to determine whether the first neighbouring relationship is applicable for at least one further state of the any neighbouring cell(s).

The receiver may be configured to receive the message from a management server.

The receiver may be configured to receive the message from a base station.

The state information may comprise at least one of the following states: Normal; ES compensating; AAS reshape; AAS split; AAS merge.

The message for a first cell may comprise only state information for the first cell, and the apparatus may further comprise a state determiner configured to generate at the first cell state information defining the state of the first cell that the neighbour relation can be used for; a transmitter configured to transmit from the first cell to any neighbouring cell defined by the neighbour relationship the first cell state information.

The apparatus may further comprise a counter definer configured to perform collection of at least one performance management counter associated with a state of the first cell and at least one state of the any neighbouring cell(s)

the counter definer may further be configured to: collect at least one performance management counter associated with a state of the first cell and at least one state of the any neighbouring cell(s); report at the end of at least one measurement collection period the defined at least one performance management counter.

According to an eighth aspect there is provided an apparatus comprising: a message generator configured to generate a message for a first cell comprising at least one of: state information for the first cell; and state information for any neighbouring cells of the first cell; a transmitter configured to transmit the message to the first cell.

The apparatus may further comprise a receiver configured to receive from the first cell at least one performance management counter associated with a state of the first cell and at least one state of the any neighbouring cell(s).

The apparatus may be a management server.

The apparatus comprising the message generator and transmitter may be base station.

A computer program product stored on a medium may cause an apparatus to perform the method as discussed herein.

An electronic device may comprise apparatus as discussed herein.

A chipset may comprise apparatus as discussed herein.

Various other aspects and further embodiments are also described in the following detailed description and in the attached claims.

SUMMARY OF THE FIGURES

The invention will now be described in further detail, by way of example only, with reference to the following examples and accompanying drawings, in which.

DESCRIPTION OF SOME EMBODIMENTS OF THE APPLICATION

In the following certain exemplifying embodiments are explained with reference to wireless or mobile communication systems serving mobile communication devices.

Before explaining in detail the certain exemplifying embodiments, certain general principles of a wireless communication system and the nodes thereof are briefly explained with reference to FIGS. 1 and 2 to assist in understanding of the herein described embodiments.

In a communication system 10 a user can be provided with a mobile communication device 1 that can be used for accessing various services and/or applications. The access can be provided via an access interface between the mobile communication device 1 and an appropriate wireless access system of a communication system 10 comprising an access node. An access node or network entity (NE) can be provided by a base station. FIG. 1 shows part of a radio access network (RAN), including a base station 2. The term base station will be used in the following and is intended to include the use of any of these network access nodes or any other suitable network entity. The communication system 10 also comprises a self-organising network management entity (not shown). The self-organising network SON functions can be integrated into the OAM (Network Management) architecture and be communicated via the Itf-S (Southbound) and Itf-N (Northbound) interfaces. In some embodiments the SON functions can also be physically integrated at the NE directly (this is a so-called distributed approach), or they can be integrated at the OAM system (this is a so-called centralised approach).

An appropriate mobile user device or station may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. In some embodiments some devices are not "personal" devices directly "operated" by a human, but devices which are integrated within vehicles, goods, containers. In some embodiments these devices can be used for a range of operations such as goods and/or vehicle tracking, supporting delivery processes, or collecting and providing status data.

A mobile communication device is often called user equipment (UE). Each mobile device 1 and base station 2 may have one or more radio channels open at the same time and may receive signals from more than one source.

Figure 1:
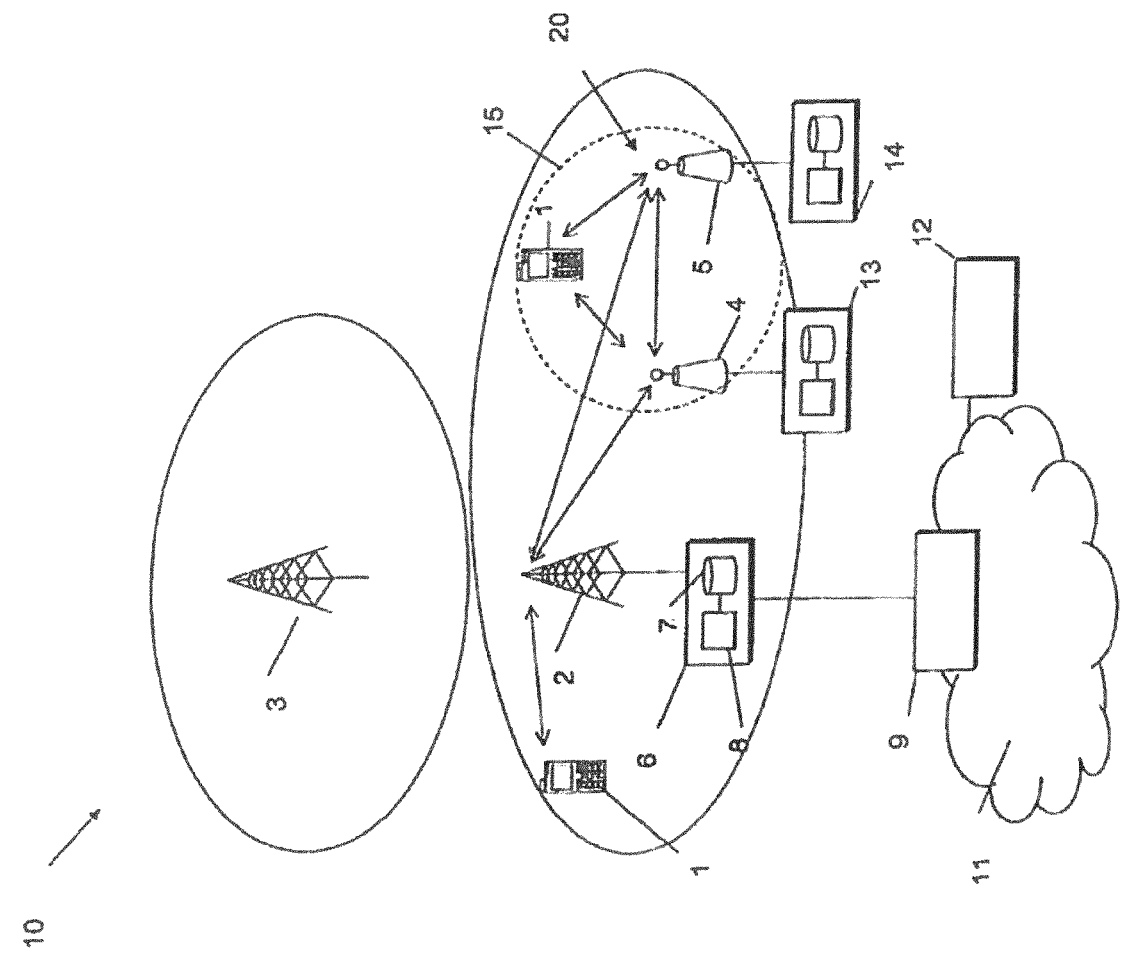
FIG. 1 shows a schematic representation of a network according to some embodiments.

FIG. 1 shows a base station 2 having a cell area associated therewith and the base station 2 is connected to relay nodes 4, 5. Each relay node can establish a connection to the base station 2 or alternatively the relay nodes can share the same backhaul link. In the cell area of the base station 2, there can be provided two relay nodes 4 and 5, but it is noted that this is by way of example only. In practice there may be more or less than two relay nodes. In relaying a relay node (RN) is wirelessly connected to the radio-access network via a donor cell, that is the cell of base station 2 of FIG. 1. FIG. 1 also shows neighbouring cells provided by another base station 3 which the relay nodes 4, 5 are not connected to.

Relay nodes may be used, for example, in block of flats and other buildings, offices, warehouses and/or factories and/or in public places, for example in shopping malls, sports or exhibition halls or arenas, particular areas of cities, on moving platforms such as trains, ships, busses, aeroplanes and so on.

The relay nodes 4, 5, can be relatively low power nodes that may be deployed to provide enhanced indoor coverage, additional capacity at hotspots or cell edge regions. For example, in the case of indoor deployment, such an access point or node may be provided for example in apartment blocks or office buildings and hence there may be a relatively high density of such access nodes.

Returning to FIG. 1, there is shown a gateway function 9 of the communication system 10 connecting a core network 11 and/or another network, application functions or services 12. A packet data network may also be provided by means of appropriate gateway nodes. Regardless of the gateway arrangement, a communication device 1 can be connected to an external data network, for example the internet via the relay nodes 4, 5 and/or the base stations 2, 3.

The base stations 2, 3 can be typically controlled by at least one appropriate controller apparatus 6. The relay nodes 4, 5 are also typically controlled by at least one appropriate controller apparatus 13, 14. Furthermore the operation of these controller apparatus can in some embodiments be controlled by the self-organising network management entity not shown.

Figure 2:
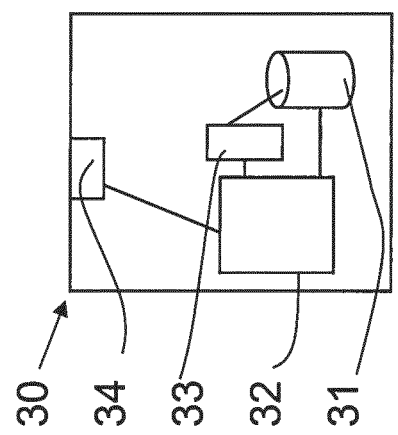
FIG. 2 shows a schematic representation of a control apparatus according to some embodiments.

FIG. 2 shows an example self-organising network management controller apparatus for the network entities (relay nodes 4, 5 or the base stations 2, 3). The controller apparatus 6 is typically provided with at least one memory 31, at least one data processor 32 and an input/output interface 34 as shown in FIG. 2. The control apparatus 6 can further comprise a coordination function layer 33. The control apparatus 6 can be configured to execute appropriate software applications to provide the desired control functions. The control apparatus 6, can in some embodiments be provided in a node and comprising at least one memory and computer program code can be configured, with the at least one processor, to cause the node to communicate with other network entities to communicate control information. At least some of the processing blocks can in some embodiments be carried out by one or more processors in conjunction with one or more memories.

The processing block may be provided by an integrated circuit or a chip set. The control apparatus can be interconnected with other control apparatuses.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB or eNB in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY)

and control plane Radio Resource Control (RRC) protocol terminations towards mobile communication devices.

Figure 3:
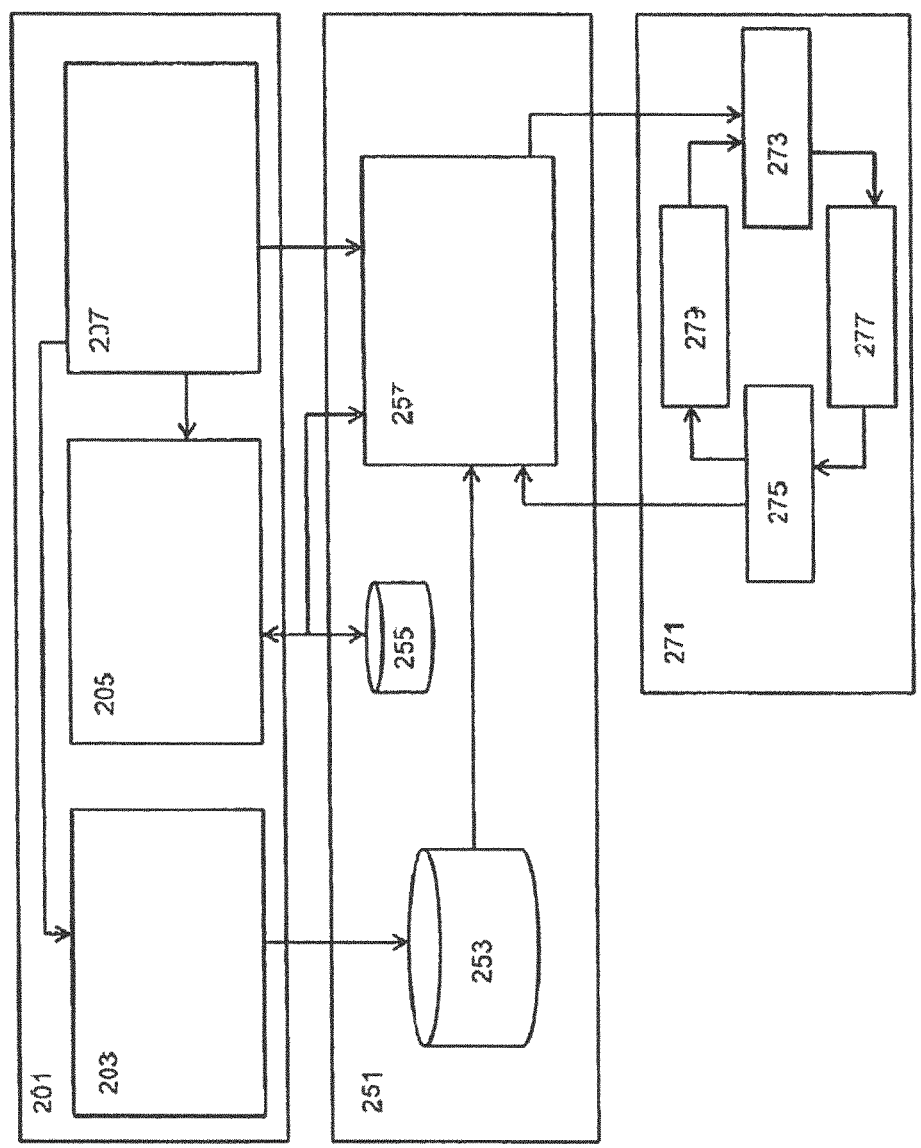
FIG. 3 shows an overview of the self-organising network according to some embodiments.

FIG. 3 shows a schematic overview of an example self-organising network management controller 251 or automated operation administration and management (OAM) function apparatus. With respect to the following examples the operation of the example self-organising network management controller focuses on the organisation of Radio Access Networks (RAN) and in particular for LTE and LTE-A RAN (E-UTRAN).

The self-organising network management controller 251 is shown operating under a pre-planned or network design layer 201 and operating on the network layer 277.

The network design layer 201 is shown comprising a network planning operator 203 configured to produce data detailing the network physical or geographical design and the network topological or logical design and pass this to the self-organising network management controller layer to be stored in the network plan repository 253.

Furthermore the network design layer 201 can comprise a network workflow and policy operator 205 configured to produce design data detailing the operation policies to be applied to the network by the self-organising network management controller layer and stored in a policies storage 255.

The network design layer 201 can furthermore comprises a self-organising network (SON) operator 207 configured to review at a design layer the operation of the self-organising network management controller and propose based on operational experience and feedback information with can be implement in the network workflow and policy operator 205 and the network planning operator 203 as well as being passed to the self-organising network management controller 251.

The self-organising network management controller in some embodiments comprises a repository 253 configured to receive the network information from the network planning operator 203 and configured to supply this information to the self-organising network management controller processor 257.

Furthermore in some embodiments the self-organising network management controller comprises a policy storage 255 configured to receive the policy information from the network workflow and policies operator 205 and further configured to supply the policies information to the self-organising network management controller processor 257.

The self-organising network management controller 251 in some embodiments comprises a self-organising network management controller processor 257 configured to receive network information from the repository 253, policy information from the policies storage 255 and furthermore receive network sensory information from the network layer 275. In some embodiments the coupling between the network layer 275 and the self-organising network management controller processor 257 are a performance management (PM) coupling providing/receiving PM information, a configuration management (CM) coupling providing/receiving CM information and a fault management (FM) coupling providing/receiving FM information. The automation of this process (analysis, decision making) is the concept of SON.

The self-organising network management controller processor 257 can in some embodiments include a coordination function controller or processor, a workflow function controller or processor and a policy enforcement controller or processor.

The network layer 271 can in some embodiments comprise actuators configured to receive the CM, FM and PM information from the self-organising network management controller processor 257 and configured to control the network elements. In some embodiments the actuators 273 can be configured to receive a feedback coupling from a network layer policy enforcement processor 279. It would be understood as described herein that in some embodiments the SON functions can therefore be physically integrated at the NE directly and the SON algorithms running on the network layer policy enforcement processor 279 (this is a so-called distributed approach), or they can be integrated at the OAM system level, and the SON algorithms running on the self-organising network management controller processor 257 (this is a so-called centralised approach). It would be understood that in some embodiments a hybrid approach can be implemented wherein some of the SON algorithms run on the network layer policy enforcement processor 279 and some of the SON algorithms run on the network layer policy enforcement processor 279.

The network layer 271 can furthermore in some embodiments comprise the network elements 277 which are configured by the actuators 273. Furthermore the network elements 277 can be configured to supply a sensor 275 with suitable CM, FM and PM information.

The network layer 271 in some embodiments comprise a sensor monitoring the CM, FM and PM information and supply at least part of this information to a policy enforcement processor within the self-organising network management controller processor and furthermore in some embodiments to a network layer policy enforcement processor 279.

The network layer 271 furthermore in some embodiments can comprise a network layer policy enforcement processor 279 configured to perform local feedback to the actuator 273.

In some embodiments self-organising network management controller processor can be configured to partition the self-organisation tasks into the areas of configuration, optimisation and healing.

Within each partition area is can be possible in some embodiments to define SON use cases. SON use cases can themselves be characterised by a trigger situation (in other words a pre-condition under which a control functionality is activated), the inputs to the use case (which may for example include the targeted network resource), the required steps to fulfil a use case, the output (for example the possible actions to be performed on the network resources), and the result (in other words the post-condition).

It would be understood that SON functions are in some embodiments the realisation of the functionality required by a SON use case. Each SON function can in some embodiments be partitioned into a monitoring part, an algorithm part and, an action or execution part.

For example a monitoring part can be defined by a monitoring of measurements, key performance indicator (KPI) or events relevant to the use case or a trigger situation. In some examples the monitoring part defines a detector functionality for the trigger situation. In some embodiments the monitoring part can be continuously active, scheduled at certain times/time intervals or be triggered on-demand (for example by a human operator).

The algorithm part furthermore in some embodiments can be defined by the acquisition of input data (in addition to monitoring data), an evaluation of network state and context, and a computation of new configurations and whether/when trigger additional tasks/functions are to be performed.

The action part is in some embodiments defined as the enforcement of the algorithm part results.

The SON functions have a generic function area which in some embodiments can be associated with the function. The function area comprises all network resources, and in particular the cells as discussed herein, which have to be manipulated by a SON function to achieve the desired goal. These resources can be defined both in terms of geographical area (where for example the network resources are a set of cells) and/or in terms of topological area (where for example the network resources are a set of router interfaces).

The SON function instances can in some embodiments be defined as the run-time instantiation of a (specific part of a) SON function. They can be understood to act on network resources in a certain area at a certain time. Thus while the "function area" discussed herein is generic (in other words implies that a function works, e.g., on a pair of two adjacent cells). The function instance area, however, is a concrete instantiation of the function (for the example introduced above, a specific pair of cells with IDs X and Y being adjacent to each other).

It would be understood that the SON function instances have a spatial scope (e.g., set of cells, set of network interfaces) and temporal scope (activity in certain time intervals). Furthermore a SON function instance may get active at any time (e.g., triggered by a network measurement crossing a threshold) without any involvement by a human operator or a conventional OAM function. However it would be understood that in some embodiments there may be situations where a SON function instance is started by the human operator. Thus SON function instances can be considered to run or operate "inside" the OAM system and/or the NE.

This therefore is different from traditional network operation and optimisation where data of an entire network domain is "aligned" to the OAM system and then modified (optimised) within a single offline function. When new NE configurations have been computed, they are "rolled out" in the next step. The execution of this alignment/rollout cycle is scheduled/planned and supported by a human operator.

The execution of SON functions can furthermore be considered to be individual and dynamic (in other words not pre-planned and rolled out).

As described herein SON functions use measurements as inputs. For example the input can be an observation of the network status and behaviour, the observations being used to determine when a desired SON function is to be started.

The measurements or observations can arrive from different sources, for example network elements such as radio base stations, user equipment, or a performance management system which is part of the operation, administration and maintenance (OAM) system. The measurements can consist of, for example, radio measurements, counters, timers, key performance indicators (KPI) and other suitable indicators. The measurements are generally not real-time, in other words not sent instantly to the requesting target but collected over a certain time period. The measurement interval or time period over which the measurement is made is typically called the granularity period (GP) and is typically defined for each measurement. The measurement data can then be collected over the whole runtime of the granularity period and at the end of the granularity period, the collected measurement data is aggregated to a measurement resource file, this file being transferred to the management system or an SON function and the next granularity period started. The granularity period start and end points are typically fixed. For example a granularity period can be every 10 minutes starting at 11.00, 11.10, 11.20 and so on. These fixed start and end times are usually defined network-wide within an operator domain as the same measurements used as input for SON functions can also be used as standard OAM performance management inputs.

One of the functions being applicable to SON functions is energy saving. Energy saving for LTE in overlaid deployment is supported by switching off the overlaid cell (whose coverage can be taken care of by the overlaying cells without changing the coverage parameters) in distributed, EM (Element Manager) centralized and NM (Network Manager) centralized solutions.

The energy saving is implemented in capacity limited deployment in NM centralized solution by switching off one cell and changing (enlarging) the coverage of other cells to compensate the energy saving cell. These coverage modifications can be enabled by implementing AAS (Active Antenna System) within access nodes such as eNBs and could lead to cells being (re)shaped, or split or merged.

With the energy saving functions above, the state of the cell as well as its coverage can be changed dynamically. When a cell changes the coverage, it may need some different neighbour relations, and some neighbour relations may be only used in some certain state(s).

Furthermore as discussed herein some (other) SON functions use the state of a cell and its neighbours and the statistics per state (either the cell itself and/or the neighbour) to make the optimizations for the specific state.

For example when the coverage of a cell and/or its neighbours is changed, the measurement settings of the cell and its neighbours such as the cell individual offset (CIO), suitable for the new state should be used, and when the state is changed back, these corresponding settings are required to be changed back. Furthermore issues (like handover issues) which occur in one state may not exist when the cell exits that state, and vice versa.

Figure 4:
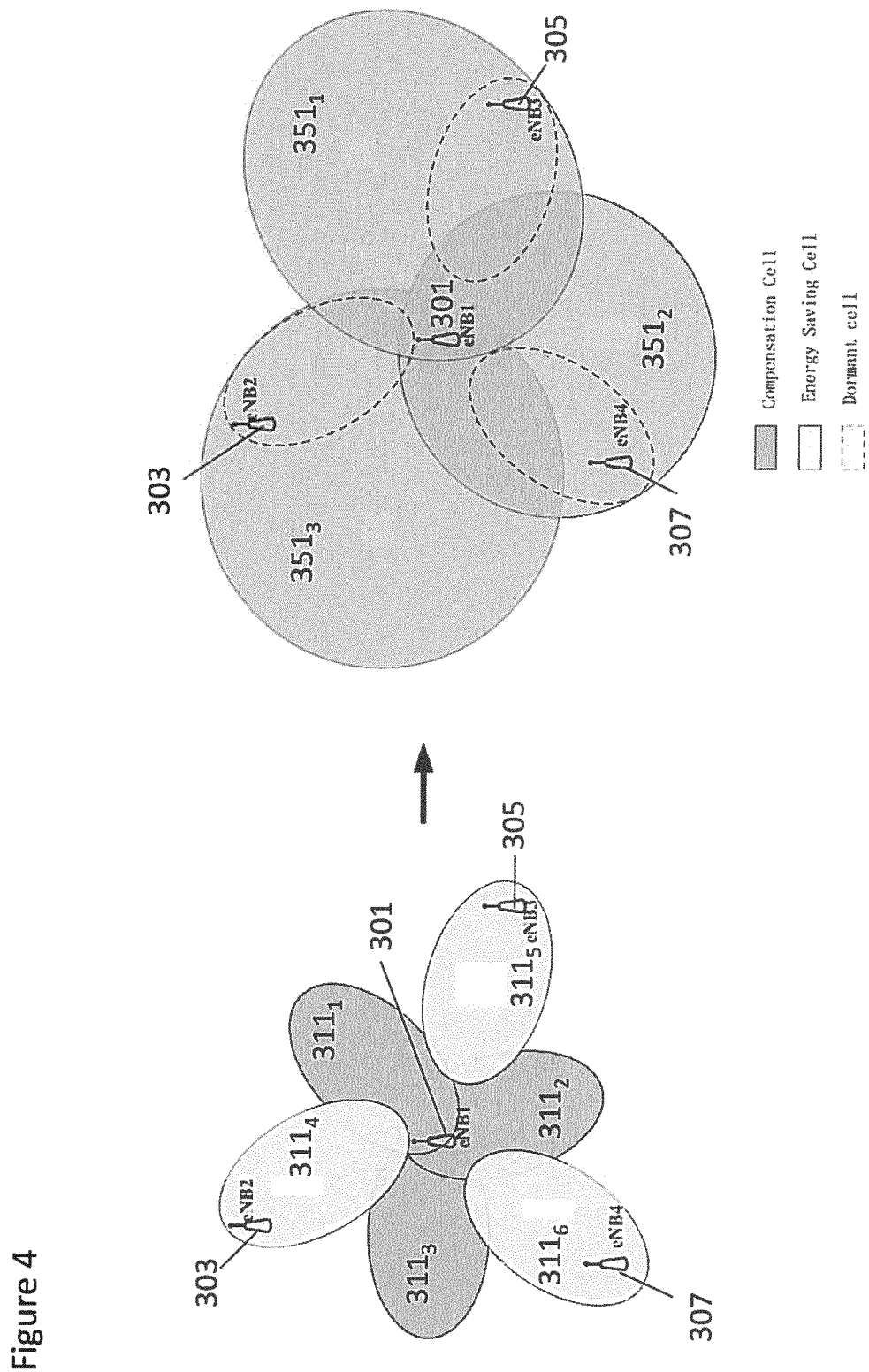
FIG. 4 shows schematically the cell network entities operating in various states for an example energy saving compensation.

For instance with respect to FIG. 4, is shown a configuration where there comprises a central cell or eNB shown by eNB1 301 and surrounded by three neighbouring cells or eNBs, eNB2 303, eNB3 305 and eNB4 307. The left hand side of FIG. 4 shows the operation of the central cell in a normal state, having coverage areas $311_1$, $311_2$, and $311_3$, which partially overlap the coverage areas of the neighbouring cells such that coverage areas $311_1$ and $311_3$ partially overlap the coverage area $311_4$ of the second cell 303, coverage areas $311_1$ and $311_2$ partially overlap the coverage area $311_5$ of the third cell 305 and coverage areas $311_3$ and $311_2$ partially overlap the coverage area $311_6$ of the third cell 307. The right hand side of FIG. 4 shows the operation of the central cell in a compensating state, having coverage areas $351_1$, $351_2$, and $351_3$, which completely overlap the coverage areas of the neighbouring cells such that coverage areas $351_1$ covers the coverage area of the third cell 305, coverage area $351_2$ covers the coverage area of the fourth cell 307 and coverage area $311_3$ covers the coverage area of the second cell 303. It would be understood that in this example the CIO of cell 1 eNB1 301 relationship with cell 2 eNB2 303 can be different when operating in the energy saving compensating state from non-compensating (normal) state, and the handovers issues from cell 1 to cell 2 which can occurred in energy saving (ES) compensating state may not exist in non-compensating state.

Furthermore as described herein the self-organising network (SON) control functions, such as mobility robustness optimisation (MRO), and coverage and capacity optimisation (CCO) are based on statistical analysis of specific failure types and rely on stationary deployment conditions at least for the time interval collecting statistics. In other words the SON control function must know the issues such as hand over (HO) failures which occur while operating in each state, and apply the optimization to each state based on issues occurred during that state.

In some circumstances the state of a cell and its neighbours may be already known. For example in the situation of distributed energy saving state (ES) when one cell c can be configured to activate and/or deactivate another cell for energy saving by employing a suitable message over the S1/X2 message interface.

However when ES application is centralized, the configuration management (CM) interface does not indicate a state (for example that the cell is operating in an ES compensating state) but the state is only known on the NM layer and the NM changes only the corresponding parameters (for example parameters such as tilt, power). In such circumstances the cell only knows its parameters have been changed but does not know that the parameters have been changed because of ES compensation or coverage and capacity optimisation (CCO), or other purposes.

Furthermore as the SON control functions are based on failure statistics, these statistics are only reliable as long as stationarity of the cell deployment can be guaranteed. In other word the statistics must not be mixed for different deployment states in order to allow proper analysis and optimisation for that state. It would be understood that the statistics should be also precise for the employment of operation, administration and management (OAM) functions, in order that the correct evaluation for the SON functions can be performed. Thus whatever deployment change is considered, for example deactivation of a cell or tilt change of a cell, it would be understood that in a cellular deployment the deployment change does not only affect the cell being changed but usually any neighbouring cells as well. For example, mobility robustness optimisation (MRO) specific failure types are collected by the eNB controlling the cell responsible for the failure.

As described herein the reporting period (or granularity period) of the performance management (PM) counters to the network management (NM) are configurable and adjustable (for example the granularity period (GP) can be 15 mins, 30 mins). Within the granularity period, the cell state (for example energy saving state) may change, but the data model of the interface (Itf-N) currently does not allow a state-specific distinction of the PM counters. This creates the situation where there is no way to distinguish how many events, like hand over failures, occur in each state as the events are accumulated over all of the period. In other words it is currently not possible to determine within a single granularity period how many events occur while the cell is in a first state (for example an energy saving compensating state), and how many events occur in another state (for example normal state) where the example cell changes state during the granularity period.

Figure 5:
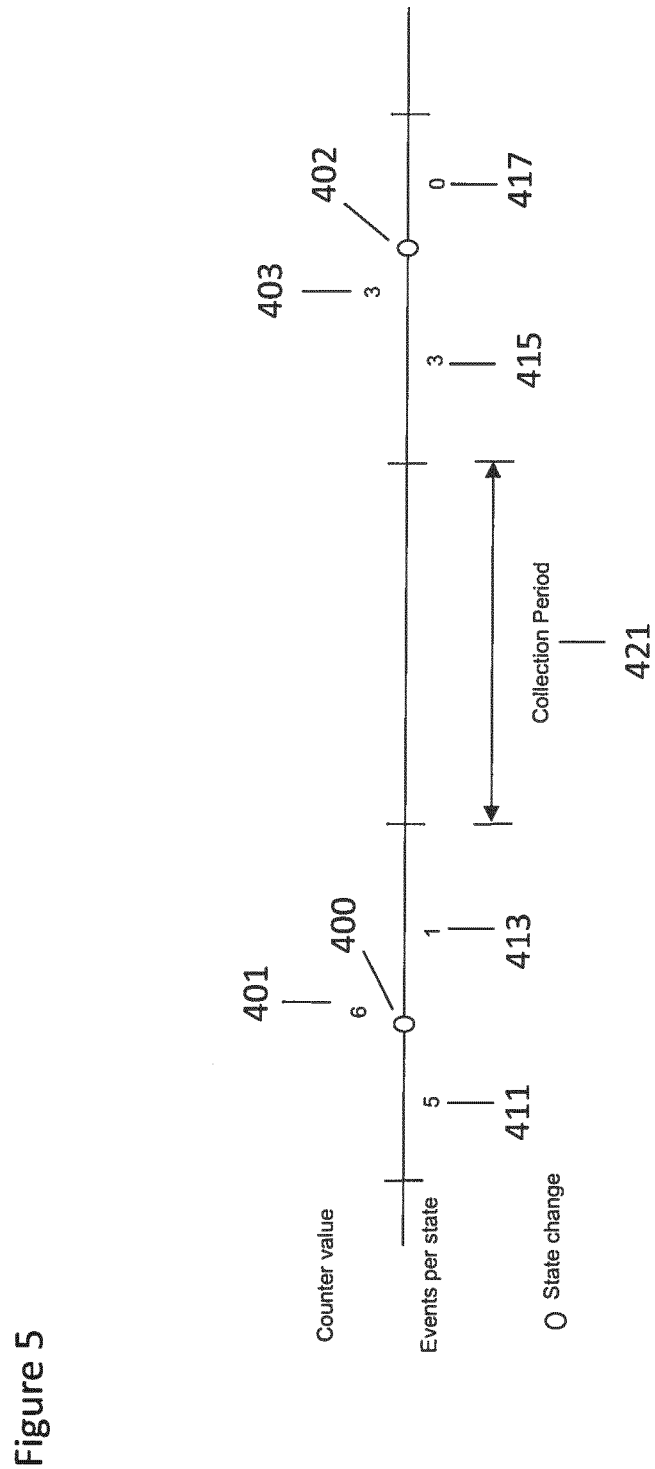
FIG. 5 shows an example of state change during the measurement collection period.

For example FIG. 5 shows a timing line where three granularity periods or collection periods 421 are shown. Within a first collection period the output counter value 401 is 6 and the third collection period the output counter value 403 is 3.

However as is shown in FIG. 5 within the first collection period a state change 400 occurs and the pre state change event count 411 before the state change is 5 and the post state change event count 413 after the state change is 1 generating the total output counter value 401 of 6. Furthermore within the third collection period a state change 402 occurs and the pre state change event count 415 before the state change is 3 and the post state change event count 417 after the state change is 0 generating the total output counter value 401 of 3. In other words the counter output values do not reflect the apparent reduction of events which occur within the collection period.

Figure 6:
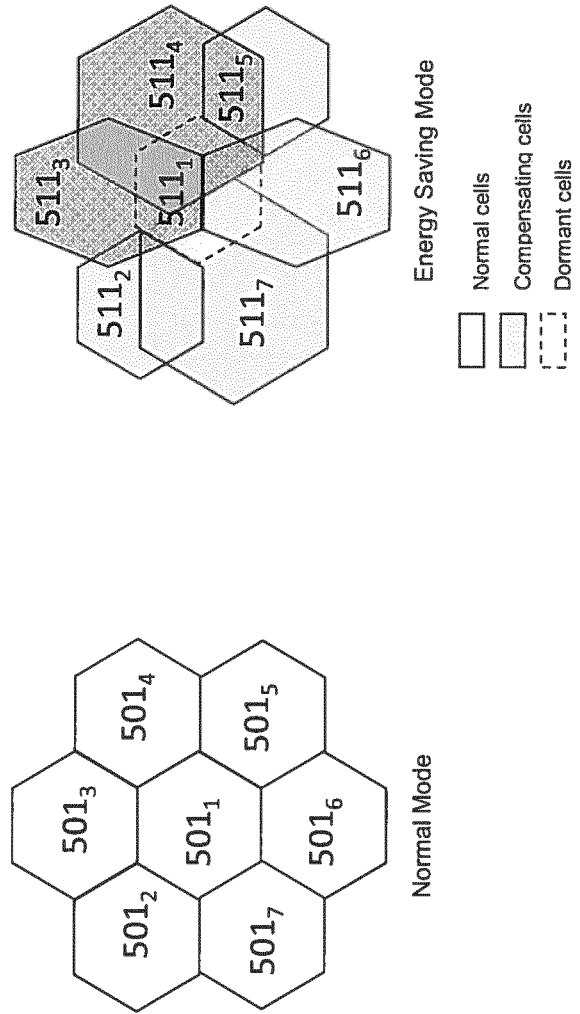
FIG. 6 shows schematically the cell network entities operating in example energy saving compensation states.

Furthermore the change of state for the cells can generate situations where based on the different cell states, the cell can have different neighbours. For instance FIG. 6 shows an example series of cells 1-6 operating in normal mode and in an energy saving mode. In the normal mode of operation each cell has approximately the same coverage area such that cell 1 has coverage area $501_1$, cell 2 has coverage area $501_2$, cell 3 has coverage area $501_3$, cell 4 has coverage area $501_4$, cell 5 has coverage area $501_5$, cell 6 has coverage area $501_6$, and cell 7 has coverage area $501_7$. In the example shown in the normal mode cell 3 and cell 4 are not neighbours of cell 6 and cell 7 being separated by cell 1. In the ES mode of operation each cell has different coverage areas such that cell 1 is a dormant cell $511_1$, cell 2 has coverage area $511_2$, which is the same as the normal cell 2 coverage area $501_2$, cell 3 has a compensating coverage area $511_3$, cell 4 has a compensating coverage area $511_4$, cell 5 has coverage area $511_5$ which is the same as the normal cell 5 coverage area $501_5$, cell 6 has a compensating coverage area $511_6$ and cell 7 has a compensating coverage area $511_7$. In the ES mode Cell 3 and Cell 4 are neighbours of Cell 6 and Cell 7 as the coverage areas of Cell 3, Cell 4, Cell 6, and Cell 7, compensate for the dormant cell.

The neighbour relations in different cell states could be modified by (added and removed by) an automatic neighbour relations (ANR) and operation administration and management function (OAM), for example cell 3 and cell 4 may be added by ANR as neighbours of cell 6 and cell 7 during ES mode.

However, since the cell 3 and cell 4 are only used as neighbours in ES mode but not used in normal mode, and the ES period can be far shorter than normal period, so the usage of cell 3 and cell 4 as neighbours can be "rare" compared to other neighbours in normal mode. Without knowing that cell 3 and cell 4 are only used in ES mode, ANR or OAM functions could wrongly remove them from the neighbour relation table (NRT) during normal mode, and could replace them with other newly found neighbours in normal mode.

The same issues exist also with other active antenna system (AAS) functionality. For example cell reshape, cell split and/or merge and other similar SON functions which shift coverage onward and back can be misrepresented due to the change of state not being effectively reported quickly enough.

It has been proposed to propagate so-called signatures describing the state of a cell being computed in the eNB to the other nodes by the X2/S1 interface as well as to OAM. However where a centralized function makes the state change, this is not practical because it would require both centralized and distributed signalling. This can waste interface resources on the X2/S1 interface because when one cell changes state and informs all of the neighbour cells this change can be part of several cells state change. For example when cells change state for one purpose (for example ES compensating) each cell would inform all of their neighbours separately which could result in a signalling flood.

Furthermore for some cases, the implementation of signalling over the X2/S1 interface may not work at all (even where the state is changed by the distributed function). For example where cell A and cell B have a unidirectional neighbour relationship from cell A to cell B. In other words cell B does not necessarily know that it is in the NCL of cell A or in other words cell A knows B but cell B does not know that it is in the neighbour list of cell A. The SON functions (like MRO) running on cell A should also know the state of cell B, since both together determine a dedicated state and allow a correct optimization (like CIO update) for the neighbour relation from cell A to cell B. But in this case where cell A is not a neighbour of cell B, cell B does not know cell A, thus cell B is not able to inform cell A about the state change (on cell B). The CIO of cell A to cell B is used only for handover from A to B and it is not important if cell B has A on its NRT. However that cell A knows the deployment state of cell B is needed.

Furthermore there are some instances where there is no X2 interface between two eNBs.

With respect to the counter issue it has been proposed that assuming that the deployment states of cell changing less frequently than the SON PM counter (or granularity period) are reported, then the centralized SON entity can be configured to assign and to sort out the PM counters according to the dedicated state. For example where the measurement collection period (or granularity period) is 15 mins, and the energy saving (ES) compensating state lasts 1 hour, then the SON function can receive at least 3 consistent reports within the 1 hour period. Furthermore where the SON function (for example a MRO function) is performing the correction (such as a CIO update) after 24 h, the function will have sufficient statistical information for each state and will be able to provide reliable corrections.

However, a problem arises where cell configurations are changed more frequently or have to react more quickly, for example not every SON function is implemented for every 24 hours. There are for example other traffic driven SON functions or actions which are not time based for generating reliable statistics, but react on absolute number of failure events or traffic load. In these situations the cell configuration changes may occur within a 15 min period and, therefore, events cannot be separated with respect to the deployment state before and afterward the state change and thus any determined measurement statistics are worthless.

With respect to the updating of neighbour states it has been proposed to include or support a setting of "no removal" for the neighbour relations, which means once the "no removal" is checked the neighbour relation cannot be removed by the ANR function. However there are some issues with this permanent setting. These can for example be that the neighbour relation may be added by an ANR function, without knowing that the neighbour relation is defined with respect to different deployment states (for example whether the neighbour is for ES mode or normal mode). Furthermore it would be understood that in such a configuration the OAM would not have knowledge of whether to set the neighbour relation to be "no removal". Secondly with SON capabilities, the coverage in ES mode can be further fine-tuned or optimised, so the neighbour relations while a first cell is deployed in ES mode may be also further changed by the changing of deployment modes in other cells 'neighbouring' the first cell. In such situations the permanence of the neighbour relation may be too strict and reduce the efficiency because the neighbour relationship (NR) may turn "bad" for some states (in other words be incorrectly defining the neighbouring cells) and should be replaced by some other NR. Thirdly without ANR, the OAM functions cannot manually solve all the issues. For instance for AAS, the OAM functionality may not know beforehand what the resultant coverage is after any cell reshaping, cell splitting and/or merging, thus the OAM functionality may not be able to configure or defined the correct neighbour relationships. In such situations automatic neighbour relation (ANR) functions are required.

The issues mentioned herein are addressed in the embodiments described herein. Specifically the concept as discussed with respect to the examples and embodiments herein employ the OAM/SON server to inform a cell the state of the neighbouring cells as well as in some embodiments to inform or configure the cell to operate in a specified mode or state. For example as discussed herein the OAM could inform (or configure) the cell of the state(s) of neighbour cells using an EUtranRelation object, or the EUtranGenericCell object and/or ExternalEUtranGenericCell object when representing a neighbour cell (of the cell). As discussed herein an alternative (or complementary) solution would be to employ the X2 ENB CONFIGURATION UPDATE message to propagate the state to the neighbouring cells.

Furthermore as discussed in embodiments the concept can be to employ the OAM/SON server to inform or configure a cell with a deployment status (for example an energy saving compensating state) of a cell (for example when the OAM performs the reconfiguration). In such embodiments the OAM informs or configures the cell with a cell state and thus it is clear to the cell (and the SON functions) that the reconfiguration change is for a specific state.

The concept as discussed within embodiments described herein furthermore is to provide a new performance manager (PM) counter (or subcounter) for a dedicated deployment status resulting from cell configuration in combination with the configuration of related neighbouring cell(s). In other words a counter or subcounter can be defined for the cell state and the neighbouring cell state permutation. In such a manner the statistics generated can be usable for any kind of implementation (for example time based, statistics threshold based), and they are also precise and reliable regardless of how long time the state lasts for.

In such a manner by separating the counters for the state of both the cell and the neighbouring cells, there may be generated many counters. In some embodiments as described in the embodiments herein subcounters are defined only for the state combinations or permutations that have been found in the collection period (granularity period) to be reported. For example where the cell does not support ES/AAS, or if the state is not used in that collection period, the cell does not need to report the subcounter associated with that state combination.

The concept of the embodiments as described herein with respect to indicating the state(s) that a Neighbour Relation (NR) can be used for employing the followings operations:

When adding a NR, the ANR/OAM function queries the state of the cell (for example wether the cell is normal, ES compensating or otherwise), and indicates the state to the NR;

If the ANR/OAM functionality finds a NR is also usable for other state(s) of the cell, then also indicates these state(s) to the NR;

Furthermore when adding a NR, the ANR/OAM queries the state of the neighbour (for example whether the neighbour cell is operating in a normal, ES compensating or other state), and indicates the state of the neighbour to the NR;

Furthermore If the ANR/OAM functionality finds a NR is also usable for other state(s) of the neighbour, then also indicates these state(s) of the neighbour to the NR;

The ANR/OAM function then periodically or regularly evaluates the utility of the NR per the state(s) that the NR can be used for, to decide to retain or keep it, remove it or replace it with others for the state(s).

Figure 7:
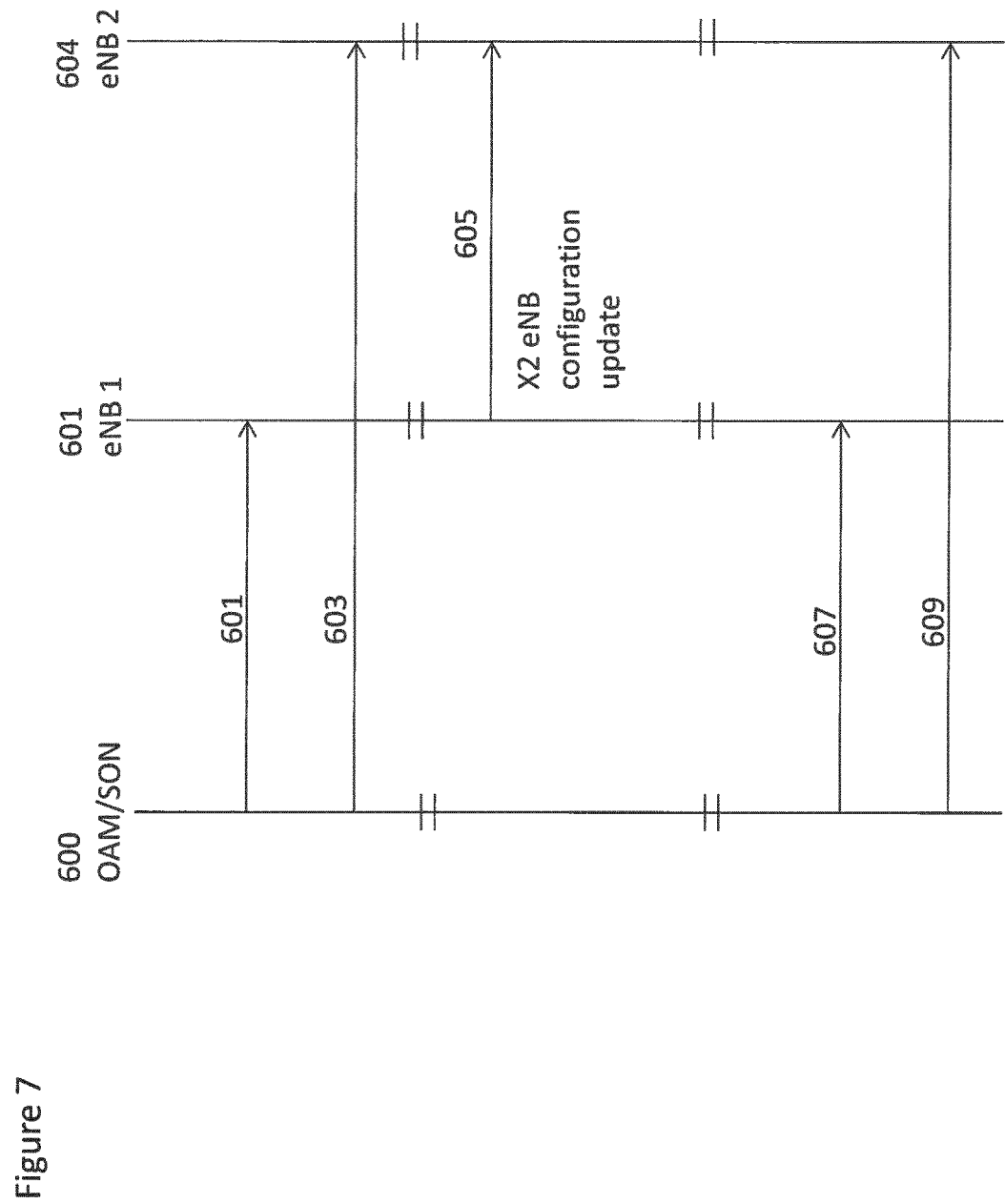
FIG. 7 shows an example time flow representation of the interaction of the self-organising network and network entities according to some embodiments.

With respect to FIG. 7 an example flow diagram is shown showing various embodiments wherein status information can be passed between entities such as the OAM/SON server and the cells (shown as eNodeB elements). In the example shown in FIG. 7 a OAM/SON server 600 is shown being configured in a system comprising a 'current' first cell eNB1 602 and a 'neighbouring' second cell eNB2 604. It would be understood that there could in some embodiments be more than one neighbouring cell and that in some embodiments the definition of a 'current' and 'neighbouring' cell is one which occurs based on the state of operation of the 'current' and 'neighbouring' cells as is discussed herein.

In some embodiments the OAM/SON server 600 can be configured to generate messages (and transmit messages) to cells, such as eNB1 602, (and eNB2 604 when the eNB2 is operating as the 'current' cell) which configure (or instruct or inform) the cell the state of the neighbouring cells and furthermore configures the cell with a specific state.

The example shown in FIG. 7 shows a OAM/SON server 600 generating a first message 601 to be sent to the first cell eNB1 602. The first message 601 can comprise information defining the state of the cell and of the neighbouring cells. In other words the message 601 comprises information on the state of the first cell eNB1 602 and also the neighbouring cell eNB2 604. Similarly the OAM/SON server 600 can generate and transmit a second message 603 to the second cell eNB2 604 the second message 603 can comprise information defining the state of the second cell 604 and also of the neighbouring cell eNB1 602.

In some embodiments the first message 601 (and the second message 603) comprises information defining the state of the neighbouring cells only. In such embodiments the OAM/SON server 600 can be configured to generate a further set of messages defining the state of the cell to be instructed. This is shown in FIG. 7 by the third message 607 and the fourth message 609. The third message 607 is generated by the OAM/SON server 600 and comprises information defining the state of the first cell eNB1 602. Similarly the fourth message 609 comprises information defining the state of the second cell eNB2 604.

In some embodiments the OAM/SON server 600 is configured to only generate messages comprising information which defines the state of the cell to be instructed. In other words only sending the third 607 and fourth 609 messages from the OAM/SON server 600. In such embodiments the cells (eNB1 602 and eNB2 604) can further be configured to generate and transmit messages from one cell to neighbouring cells comprising information informing the recipient cell which state the transmitting cell is in. This is shown in FIG. 7 by the message 605 generated from the first cell 602 eNB1 to the second cell eNB2 604. In some embodiments this cell to cell communication message can be a X2 eNB configuration update message which propagates the state to the neighbouring cell.

Figure 9:
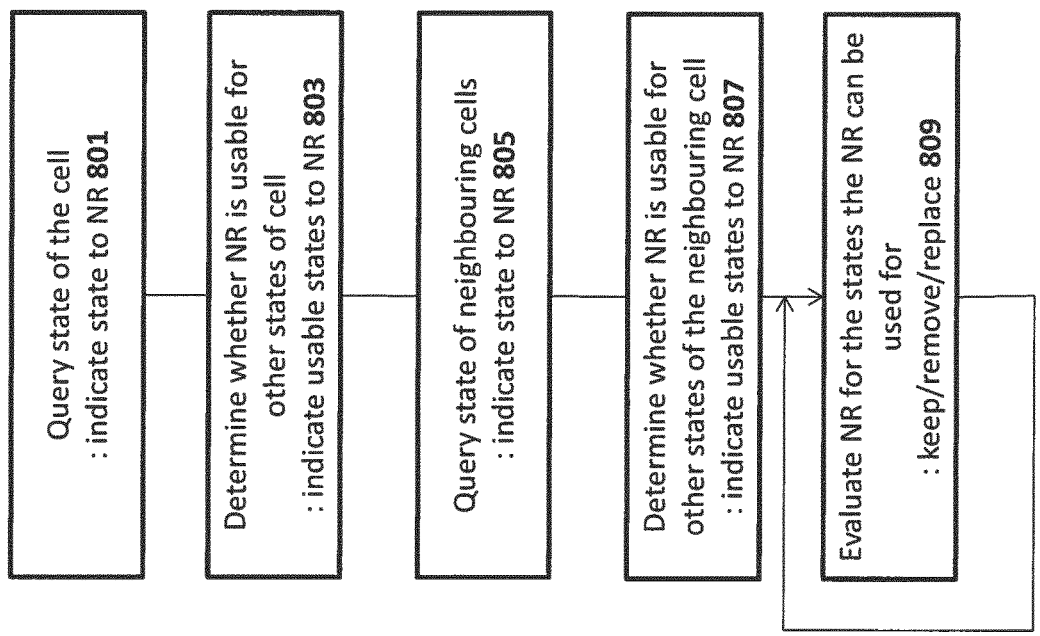
FIG. 9 shows an example flow diagram of determining current and neighbouring network entity state according to some embodiments.

With respect to FIG. 9 the operation of managing neighbour relation information according to the embodiments described herein is shown. The example shown in FIG. 9 shows the OAM server which implements an automatic neighbour relation (ANR) function.

In some embodiments the ANR/OAM is configured to add a neighbour relation or relationship between cells. In such embodiments the ANR/OAM is configured to generate a query to determine the state of the cell. For example whether the cell is currently operating a normal mode, an energy-saving compensating mode or some other mode. The ANR/OAM can then be configured to indicate the state to the neighbour relations (NR) function.

The operation of querying the state of the cell and indicating the state to the neighbouring relation is shown in FIG. 9 by step 801.

Furthermore the ANR/OAM can be configured to determine whether the determined NR is usable for other states of the cell. These other usable states can then be indicated to the NR.

The operation of determining whether the NR is suitable for further states of the cell and indicating the usable states to the NR is shown in FIG. 9 by step 803.

Furthermore in generating the NR the ANR/OAM can query the state of the neighbouring cells. In other words determine whether the neighbouring cells are operating in a normal mode, or an energy-saving compensating mode or some other mode. The state of the neighbouring cells can then be indicated to the neighbour relations (NR).

The operation of querying the state of the neighbouring cells and indicating the states to the NR are is shown in FIG. 9 by step 805.

Furthermore the ANR/OAM can be configured to determine whether the NR is also usable for other states of the neighbouring cell and indicate these states to the NR.

The operation of determining whether the NR is usable for other states of the neighbouring cell and indicating the usable states to the NR is shown in FIG. 9 by step 807.

Furthermore the ANR/OAM can be configured to periodically or regularly evaluate the utility of the NR for the states that the NR can be used for. The results of the evaluation can then be employed by the ANR/OAM to then determine whether to keep, remove, or replace the NR with others for the states.

The operation of evaluating the NR for the states is shown in FIG. 9 by step 809.

With respect to indicating the state of the source cell and of the neighbouring that a NR is useful for, in other words generating a NR specific parameter indicating the state of the source cell and the neighbouring cell that the NR can be used for could be to add the attributes shown below to the EUtranRelation IOC.

| Attribute name | Support Qualifier | isReadable | isWritable | isInvariant | isNotifyable |
|---|---|---|---|---|---|
| tCI | O | M | M | — | M |
| isRemoveAllowed | CM | M | M | — | M |
| isHOAllowed | CM | M | M | — | M |
| isICICInformationSendAllowed | CM | M | M | — | M |
| isLBAllowed | CM | M | M | — | M |
| isESCoveredBy | CM | M | M | — | M |
| qOffset | CM | M | M | — | M |
| cellIndividualOffset | CM | M | — | — | M |

-continued

|  | Support Qualifier | isReadable | isWritable | isInvariant | isNotifyable |
|---|---|---|---|---|---|
| stateOfSourceCellUsedFor |  | M | M | M | — | M |
| stateOfNeighbourCellUsedFor |  | M | M | M | — | M |
| Attribute related to role |  |  |  |  |  |
| adjacentCell |  | M | M | M | — | M |

The definition for these attributes could be for example:

| Attribute Name | Documentation and Allowed Values | Properties |
|---|---|---|
| stateOfSource-CellUsedFor | The state (list) of the source cell that the neighbour can be used for. It could be one or more of the following state:<br>Normal<br>ES compensating<br>AAS reshape<br>AAS split<br>AAS merge | type: <<enumeration>><br>multiplicity: 1 . . . n*<br>isOrdered: N/A<br>isUnique: N/A<br>defaultValue: None<br>isNullable: No |
| stateOfNeigh-bourCellUsedFor | See above | See above |

In some embodiments the two attributes can be combined to a single attribute but with values indicating the state of the source cell and the state of the neighbour cell respectively.

Figure 8:
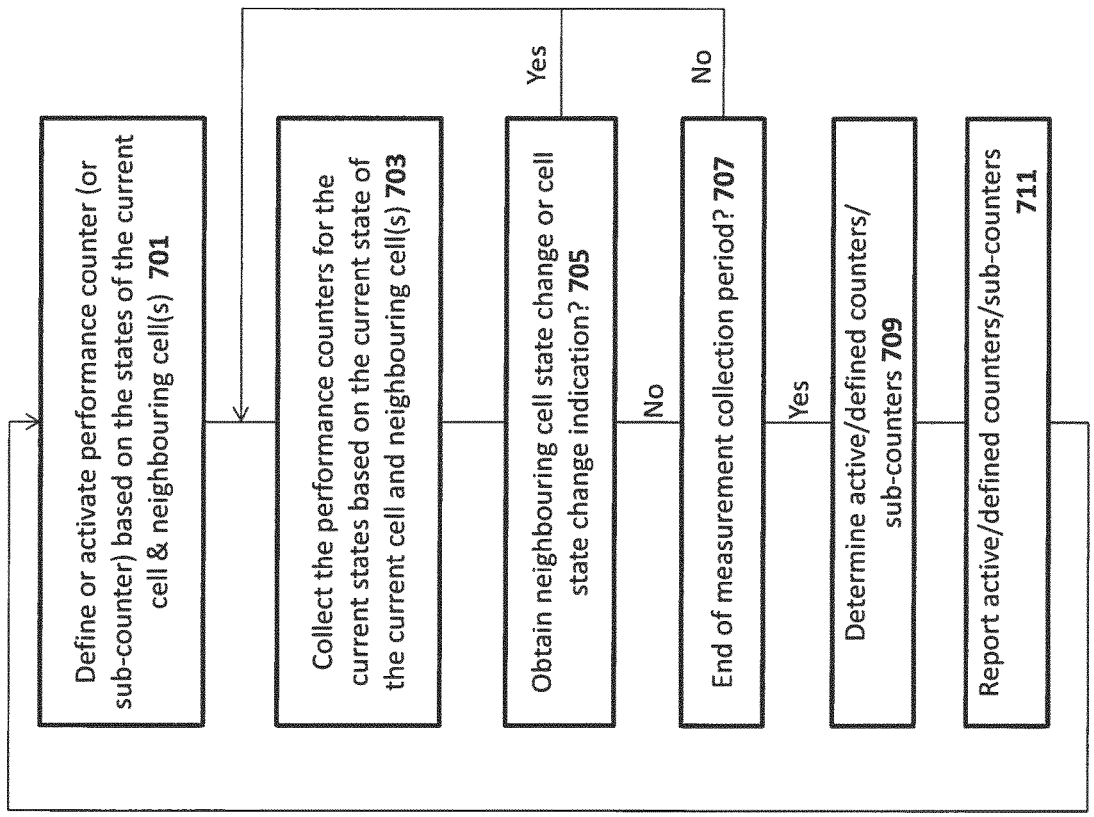
FIG. 8 shows a flow diagram of the operation of counter reporting based on state defined counters and/or sub-counters according to some further embodiments.

With respect to FIG. 8 a flow diagram showing an example performance counter configuration is shown.

In some embodiments the cell can be configured to define or activate a performance counter or sub-counter which is based on the permutation or combination of states of the determined current cell and the neighbouring cell(s).

The operation of defining or activating a performance counter or sub-counter based on the states of the current cell and neighbour cell(s) is shown in FIG. 8 by step 701.

The cell then collects the performance counters for the current states based on the current state of the current cell and neighbour cell(s).

The operation of collecting the performance counters for the current states based on the current state of the current cell and neighbour cell(s) is shown in FIG. 8 by step 703

In some embodiments the cell determines whether a change of the state of the current cell or neighbour cell(s) is obtained.

The operation of determining whether the apparatus obtains a neighbouring cell state change or cell state change indication is shown in FIG. 8 by step 705.

Once the change of the state current cell or neighbour cell(s) is obtained, the cell then collects the performance counters based on the new current state. In other words passes back to step 703.

The cell can then determine whether the measurement collection period (or granularity period) has ended.

The operation of determining whether the end of the measurement collection period has been met is shown in FIG. 8 by step 707.

Where the measurement collection period has not ended then the operation can pass back to the operation of collecting performance counters based on the current state of the current state of the current cell and neighbour cell(s) in other words passing back to step 703.

Where the end of measurement collection period (or granularity period) has been met then the operation can pass to the step of determining which of the counters or sub counters are active or have been defined.

The operation of determining the active or defined counters or sub counters is shown in FIG. 8 by step 709.

The cell can then be configured to report the active or defined sub-counters or counters only.

The operation of reporting the active or defined counters only is shown in FIG. 8 by step 711.

The operation can then be passed back to the next measurement collection period.

In other words pass back to step 701.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method comprising:
   receiving a message at a first cell comprising at least one of: state information for the first cell, and state information for any neighbouring cells of the first cell, wherein the state information comprises at least one of the following states:
   Normal;
   ES compensating;
   AAS reshape;
   AAS split; and
   AAS merge;
   determining a neighbouring relationship between the first cell and any neighbouring cells dependent on the state information; and
   performing collection of at least one performance management counter associated with a state of the first cell and at least one state of the any neighbouring cell(s).

2. The method as claimed in claim 1, wherein determining a neighbouring relationship between the first cell and any neighbouring cells comprises:
   determining for a first neighbouring relationship a state of the first cell;
   determining whether the first neighbouring relationship is applicable for at least one further state of the first cell;
   determining for the first neighbouring relationship a state of any neighbouring cell(s); and
   determining whether the first neighbouring relationship is applicable for at least one further state of the any neighbouring cell(s).

3. The method as claimed in claim 2, wherein receiving a message for a first cell comprising at least one of: state information for the first cell; and state information for any neighbouring cells of the first cell is from a management server.

4. The method as claimed in claim 2, wherein receiving a message for a first cell comprising at least one of: state information for the first cell; and state information for any neighbouring cells of the first cell is from a base station.

5. The method as claimed in claim 1, wherein receiving a message for a first cell comprises only state information for the first cell, the method further comprising:
   generating at the first cell state information defining the state of the first cell that the neighbour relation can be used for; and
   transmitting from the first cell to any neighbouring cell defined by the neighbour relationship the first cell state information.

6. The method as claimed in claim 1, wherein performing collection of at least one performance management counter associated with a state of the first cell and at least one state of the any neighbouring cell(s) further comprises:
   collecting at least one performance management counter associated with a state of the first cell and at least one state of the any neighbouring cell(s); and
   reporting at the end of at least one measurement collection period the defined at least one performance management counter.

7. A method comprising:
   generating a message for a first cell comprising at least one of: state information for the first cell; and state information for any neighbouring cells of the first cell, wherein the state information comprises at least one of the following states:
   Normal;
   ES compensating;
   AAS reshape;
   AAS split; and
   AAS merge;
   transmitting the message to the first cell; and
   receiving from the first cell at least one performance management counter associated with a state of the first cell and at least one state of the any neighbouring cell(s).

8. The method as claimed in claim 7, wherein the method is performed on a management server.

9. The method as claimed in claim 7, wherein generating a message for a first cell comprising at least one of: state information for the first cell; and state information for any neighbouring cells of the first cell; and transmitting the message to the first cell are performed on a base station.

10. An apparatus comprising at least one processor and at least one memory including computer program code, the at least one memory and the computer program code configured, with the at least one processor, to cause the apparatus at least to:
    receive a message at a first cell comprising at least one of: state information for the first cell; and state information for any neighbouring cells of the first cell, wherein the state information comprises at least one of the following states:
    Normal;
    ES compensating;
    AAS reshape;
    AAS split; and
    AAS merge;
    determine a neighbouring relationship between the first cell and any neighbouring cells dependent on the state information; and
    perform collection of at least one performance management counter associated with a state of the first cell and at least one state of the any neighbouring cells.

11. An apparatus comprising at least one processor and at least one memory including computer program code, the at least one memory and the computer program code configured, with the at least one processor, to cause the apparatus at least to:
    generate a message for a first cell comprising at least one of: state information for the first cell; and state information for any neighbouring cells of the first cell, wherein the state information comprises at least one of the following states:
    Normal;
    ES compensating;
    AAS reshape;
    AAS split; and
    AAS merge;
    transmit the message to the first cell; and
    receive from the first cell at least one performance management counter associated with a state of the first cell and at least one state of the any neighbouring cell(s).

12. An apparatus comprising:
    a message generator configured to generate a message for a first cell comprising at least one of: state information for the first cell; and state information for any neighbouring cells of the first cell, wherein the state information comprises at least one of the following states:
Normal;
ES compensating;
AAS reshape;
AAS split; and
AAS merge;
a transmitter configured to transmit the message to the first cell; and
a message receiver configured to receive from the first cell at least one performance management counter associated with a state of the first cell and at least one state of the any neighbouring cell(s).

* * * * *